(12) United States Patent
Moon

(10) Patent No.: US 9,548,479 B2
(45) Date of Patent: Jan. 17, 2017

(54) BATTERY PACK AND METHOD FOR MANUFACTURING THE SAME

(71) Applicant: SAMSUNG SDI CO., LTD., Yongin-si, Gyeonggi-do (KR)

(72) Inventor: Chongsop Moon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 125 days.

(21) Appl. No.: 13/933,352

(22) Filed: Jul. 2, 2013

(65) Prior Publication Data

US 2014/0220413 A1    Aug. 7, 2014

(30) Foreign Application Priority Data

Feb. 5, 2013  (KR) ......................... 10-2013-0012859

(51) Int. Cl.
*H01M 2/02*  (2006.01)
*H01M 2/10*  (2006.01)

(52) U.S. Cl.
CPC ....... *H01M 2/1022* (2013.01); *Y10T 29/49114* (2015.01); *Y10T 156/1043* (2015.01)

(58) Field of Classification Search
CPC .............................. H01M 2/1022; H01M 2/02
See application file for complete search history.

(56) References Cited

U.S. PATENT DOCUMENTS

2009/0023057 A1    1/2009  Kim
2012/0214046 A1    8/2012  Lim

FOREIGN PATENT DOCUMENTS

| JP | 2001-250516 | * | 9/2001 | ............. H01M 2/02 |
| JP | 2005-123007 | * | 5/2005 | ............. H01M 2/10 |
| KP | 10-2005-0000725 | * | 1/2005 | ............. H01M 2/10 |
| KR | 10-0870355 B1 | | 11/2008 | |
| KR | 10-2011-0105945 A | | 9/2011 | |
| KR | 10-2012-0096886 A | | 8/2012 | |

* cited by examiner

*Primary Examiner* — Helen O Conley
(74) *Attorney, Agent, or Firm* — Lee & Morse, P.C.

(57) ABSTRACT

A battery pack includes a first battery and a second battery each having a bent part at one side; and an adhesion member interposed between the bent part of the first battery and the bent part of the second battery and adhering the bent part of the first battery to the bent part of the second battery.

14 Claims, 8 Drawing Sheets

BATTERY PACK AND METHOD FOR MANUFACTURING THE SAME

CROSS-REFERENCE TO RELATED APPLICATION

This application claims priority to and the benefit of Korean Patent Application No. 10-2013-0012859, filed on Feb. 5, 2013, in the Korean Intellectual Property Office and entitled: "BATTERY PACK AND METHOD FOR MANUFACTURING THE SAME," which is incorporated by reference herein in its entirety.

BACKGROUND

1. Field

Embodiments relate to a battery pack and a method for manufacturing the same.

2. Description of the Related Art

In general, a secondary battery is classified into a cylindrical battery, a prismatic battery, and a pouch-type battery according to the external shape of a case to accommodate an electrode assembly.

SUMMARY

Embodiments are directed to a battery pack, including a first battery and a second battery each having a bent part at one side; and an adhesion member interposed between the bent part of the first battery and the bent part of the second battery and adhering the bent part of the first battery to the bent part of the second battery.

The first battery and the second battery may be pouch-type batteries.

The adhesion member may be a thermosetting tape.

Each of the bent part of the first battery and the bent part of the second battery may have a first surface and a second surface opposite to the first surface.

The adhesion member may be interposed between the first surface of the bent part of the first battery and the first surface of the bent part of the second battery.

The adhesion member may be shaped as a letter "T" having a head, and the head of the adhesion member may cover an end of the bent part of the first battery and an end of the bent part of the second battery.

The adhesion member may be interposed between the second surface of the bent part of the first battery and the second surface of the bent part of the second battery.

The adhesion member may be shaped as a letter "Z" having a head and a tail, the head of the adhesion member may cover an end of the bent part of the first battery, and the tail of the adhesion member may cover an end of the bent part of the second battery.

The battery pack may further include a clamp covering the second surface of the bent part of the first battery, the second surface of the bent part of the second battery, and the end of the bent part of the first battery and the end of the bent part of the second battery.

The clamp may be an insulator.

Embodiments are also directed to a method for fabricating a battery pack, the method including arranging a first battery and a second battery such that one side of the first battery and one side of the second battery face each other, and preparing an adhesion member interposed between the one side of the first battery and the one side of the second battery; welding the adhesion member to adhere the one side of the first battery to the one side of the second battery; and bending the one side of the first battery and the one side of the second battery to form bent parts at the first and second batteries.

The first battery and the second battery may be pouch-type batteries.

The adhesion member may be a thermosetting tape.

Each of the one side of the first battery and the one side of the second battery may have a first surface and a second surface opposite to the first surface.

In the preparing, the first battery and the second battery may be arranged to face each other, and the adhesion member may be interposed between the first surface of the one side of the first battery and the one side of the bent part of the second battery.

The adhesion member may be shaped as a letter "T" having a head, and the head of the adhesion member may cover an end of one side of each of the first and second batteries.

In the preparing, the first battery and the second battery may be arranged such that the second surface of one side of the first battery and the second surface of one side of the second battery face each other, and the adhesion member may be interposed such that after the bending the adhesion member is between the second surface of one side of the first battery and the second surface of one side of the second battery.

The adhesion member may be shaped as a letter "Z" having a head and a tail, the head of the adhesion member may cover an end of the bent part of the first battery, and the tail of the adhesion member may cover an end of the bent part of the second battery.

The method may further include, after the bending, clamping the second surface of the one side of the first battery, the second surface of the one side of the second battery, and the end of the bent part of the first battery and the end of the bent part of the second battery using a clamp.

The clamp may be an insulator.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey example implementations to those skilled in the art.

As used herein, the term "and/or" includes any and all combinations of one or more of the associated listed items. In addition, the terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the terms a first surface, a second surface, etc., may be used herein to describe particular contents of the example embodiments, these terms are only used to distinguish one surface from another surface and are not intended to be limiting.

Figure 1:
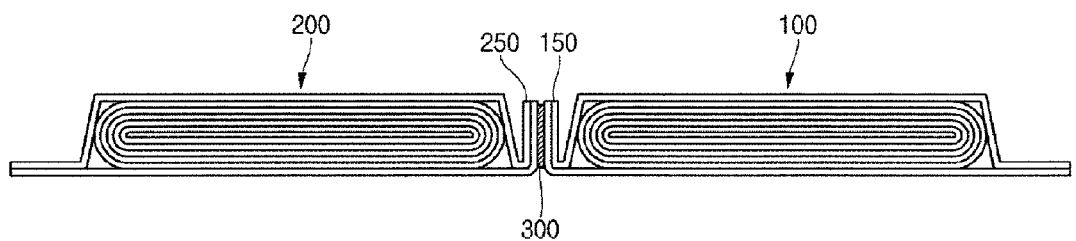
FIG. 1 illustrates a cross-sectional view of a battery pack according to an embodiment.
Figure 2A:
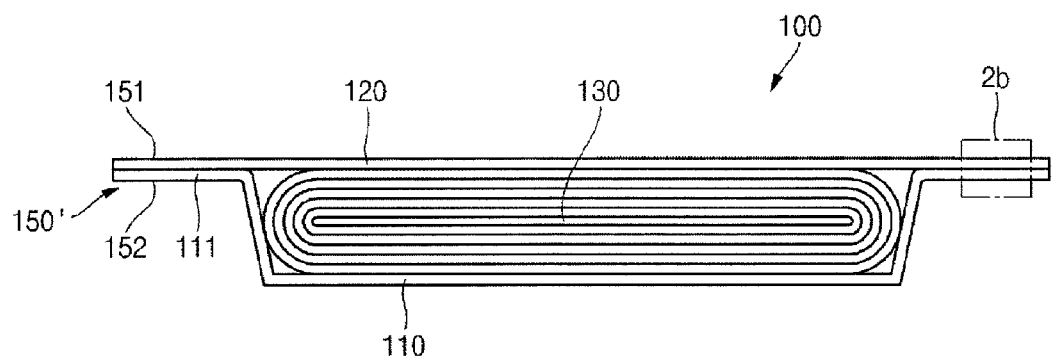
FIG. 2A illustrates a cross-sectional view of a pouch battery in the battery pack shown in FIG. 1.

FIG. 1 illustrates a cross-sectional view of a battery pack according to an embodiment. FIG. 2A illustrates a cross-sectional view of a pouch battery in the battery pack shown in FIG. 1, and FIG. 2B is an enlarged view of area 2b shown in FIG. 2A.

Figure 2B:
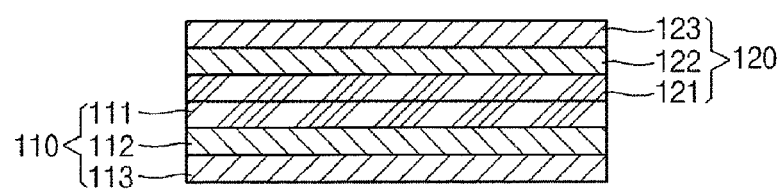
FIG. 2B is an enlarged view of area 2b shown in FIG. 2A.

In the example embodiment shown in FIGS. 1 to 2B, a battery pack 1000 includes a first battery 100, a second battery 200 spaced a predetermined distance apart from the first battery 100 and arranged in the same direction as the first battery 100, and an adhesion member 300 adhering the first battery 100 to the second battery 200.

The first battery 100 and the second battery 200 may have the same configuration, and thus the following description will be made with regard to only the first battery 100.

In the first battery 100, an electrode assembly 130 may be received in a case having pouch cases 110 and 120. A pouch having the pouch cases 110 and 120 may include a pouch body 110 and a pouch cover 120 sealing the pouch body 110.

The pouch cases 110 and 120 may include metal layers 112 and 122, first resin layers 111 and 121 each positioned on one surface of the metal layers 112 and 122, and second resin layers 113 and 123 each positioned on the other surface of the metal layers 112 and 122. The metal layers 112 and 122 may be made of, e.g., aluminum thin films. The first resin layers 111 and 121 may be positioned on inner surfaces of the pouch cases 110 and 120, and may be made of a thermally adhesive synthetic resin such as polypropylene or polyethylene. In an implementation, the first resin layers 111 and 121 may be made of casted polypropylene (CPP). The second resin layers 113 and 123 may be resin material such as polyethylene terephthalate (PET), and may be positioned on outer surfaces of the pouch cases 110 and 120 to prevent the outer surfaces of the pouch cases 110 and 120 or the electrode assembly 130 from being damaged by external pressures or scratches.

The pouch body 110 may be formed by deep drawing and may have a substantially rectangular parallelepiped internal space to receive the electrode assembly 130. The internal space may have a rectangular bottom surface, and four side surfaces vertically formed along four sides of the bottom surface. A flange 111 extending in parallel with the bottom surface may be provided to the outside of top ends of at least three of the four side surfaces. The pouch cover 120 may be shaped of a rectangular sheet and may have three of four sides sealed with the flange 111 of the pouch body 110, to hermetically seal the internal space of the pouch body 110.

A first surface 151 that is one surface of the pouch cover 120, and a second surface 152 that is the other surface of the flange 111 facing the opposite side of the first surface 151, may be provided at one side 150' of the pouch, at which the flange 111 of the pouch body 110 and the pouch cover 120 are adhered to each other.

The side 150' of the pouch having the pouch cases 110 and 120 may be bent, forming a bent part 150. The adhesion member 300 may be interposed between the first surface 151 of the bent part 150 of the first battery 100 and the first surface 251 of the bent part 250 of the second battery 200 to adhere the first battery 100 to the second battery 200.

The adhesion member 300 may include an adhesive having adhesion in itself. The adhesion member 300 may be a double-sided tape having an adhesive material coated on its both sides. In an implementation, the adhesion member 300 may be a thermosetting tape (a heat-fusible tape). The thermosetting tape is a tape having a thermosetting adhesive material coated on both surfaces of a base film, and once it is hardened by heat applied during adhesion, it is not melted even if heat is again applied. Thus, the adhesion member 300 may provide high adhesion reliability even when heat is generated from the first battery 100 and the second battery 200. The adhesion member 300 may be made of a material which may be adhered in an easy manner and has excellent adhesion reliability against heat and external shock. The adhesion member 300 may provide high adhesion performance by the reaction of heat and pressure. In an implementation, the adhesion member 300 may be a thermoplastic tape that has a high welding speed and may be welded at a low temperature.

Next, a battery pack 2000 according to another example embodiment will be described.

Figure 3:
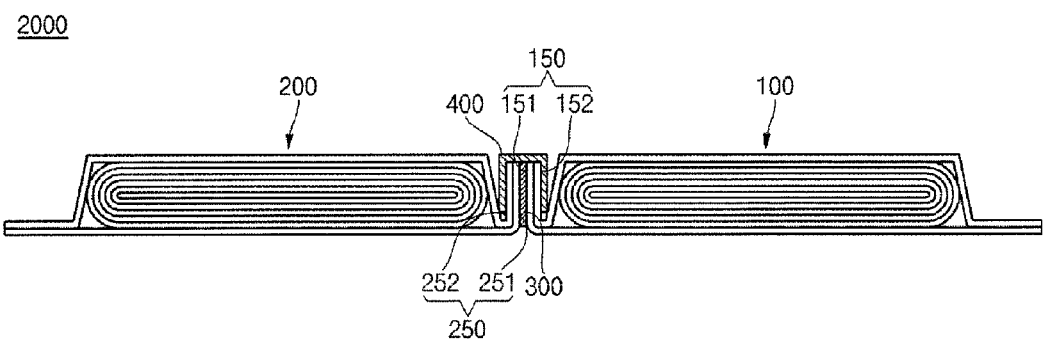
FIG. 3 illustrates a cross-sectional view of a battery pack according to another example embodiment.

FIG. 3 illustrates a cross-sectional view of a battery pack according to another example embodiment In the example embodiment shown in FIG. 3, the battery pack 2000 includes a first battery 100, a second battery 200, an adhesion member 300, and a clamp 400.

As compared to the battery pack 1000 according to the previous example embodiment, the battery pack 2000 further includes the clamp 400. The battery pack 2000 according to the present example embodiment will now be described with regard to the clamp 400. In addition, components of the battery pack 2000 according to the present example embodiment that are the same as or similar to that of the battery pack 1000 shown in FIG. 1 will be denoted by the same reference, and details thereof may not be repeated.

An electrode plate forming the electrode assembly 130 may be made of a metallic material. Thus, a burr (not shown) may exist on a cut surface during a molding process. The first resin layers 111 and 121 of pouch cases 110 and 120 may be damaged by the burr, and the electrode plate may be electrically connected to the metal layers 112 and 122 of the pouch cases 110 and 120. The metal layers 112 and 122 may be exposed to the outside at ends of bent parts 150 and 250 of the first battery 100 and the second battery 200. Thus, an unexpected electrical short-circuit may occur between the ends of the bent parts 150 and 250 of the first battery 100 and the second battery 200 and an external device (not shown) or an external circuit (not shown) electrically connected thereto. The ends of the bent parts 150 and 250 may be insulated from the outside.

The clamp 400 may be formed of an insulator substantially shaped as a letter 'n', and may cover a second surface 152 of a bent part 150 of the first battery 100, a second surface 252 of a bent part 250 of the second battery 200, and ends of the bent parts 150 and 250 of the first and second batteries 100 and 200. The clamp 400 may prevent an electrical short-circuit from occurring between the ends of the bent parts 150 and 250 and an external device (for example, an external set, a protective circuit module, etc.). In addition, the clamp 400 may hold the second surfaces 152 and 252 of the bent parts 150 and 250 by a mechanical force. Thus, the first battery 100 and the second battery 200 may be more firmly welded to each other.

Next, a battery pack 3000 according to still another example embodiment will be described.

Figure 4:
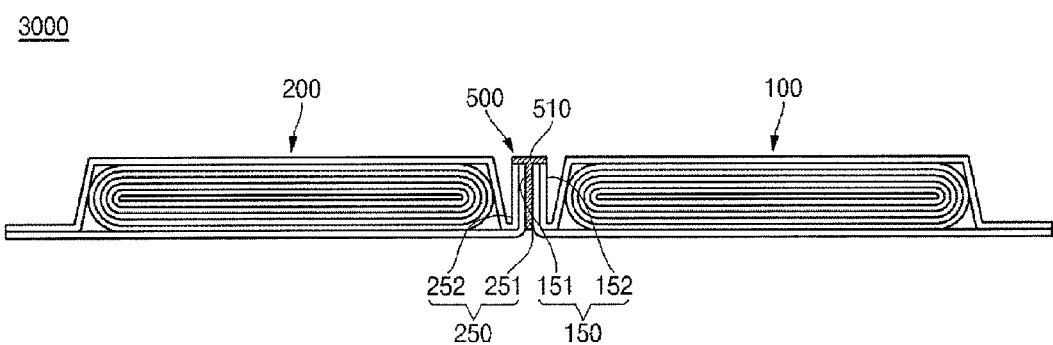
FIG. 4 illustrates a cross-sectional view of a battery pack according to still another example embodiment.

FIG. 4 illustrates a cross-sectional view of a battery pack according to still another example embodiment.

Referring to FIG. 4, the battery pack 3000 according to the present example embodiment includes a first battery 100, a second battery 200, and an adhesion member 500.

The battery pack 3000 is different from the battery pack 1000 in view of a configuration of an adhesion member 500. Thus, the battery pack 3000 according to the present example embodiment will now be described with regard to the adhesion member 500. In addition, components of the battery pack 3000 according to the present example embodiment that are the same as or similar to that of the battery pack 1000 shown in FIG. 1 will be denoted by the same reference, and details thereof may not be repeated.

As described above, metal layers 112 and 122 may be exposed to the outside at ends of bent parts 150 and 250 of the first battery 100 and the second battery 200. Thus, an unexpected electrical short-circuit may occur between the ends of the bent parts 150 and 250 of the first battery 100 and the second battery 200 and an external device (not shown) or an external circuit (not shown) electrically connected thereto. The ends of the bent parts 150 and 250 may be insulated from the outside.

In the present example embodiment, the adhesion member 500 is shaped as a letter "T" having a head 510, and the head 510 of the adhesion member 500 covers ends of bent parts 150 and 250 of the first and second batteries 100 and 200. In an implementation, only portions of the head 510 corresponding to the ends of the bent parts 150 and 250 are coated with an adhesive material. The adhesion member 500 may be formed of an insulator.

The adhesion member 500 may prevent an electrical short-circuit from occurring between the ends of the bent parts 150 and 250 and an external device (for example, an external set, a protective circuit module, etc.). In addition, the adhesion member 500 may be simultaneously applied to first surfaces 151 and 251 of the bent parts 150 and 250 and the ends of the bent parts 150 and 250. Thus, the first battery 100 and the second battery 200 may be more firmly welded to each other.

Next, a battery pack 4000 according to still another example embodiment will be described.

Figure 5:
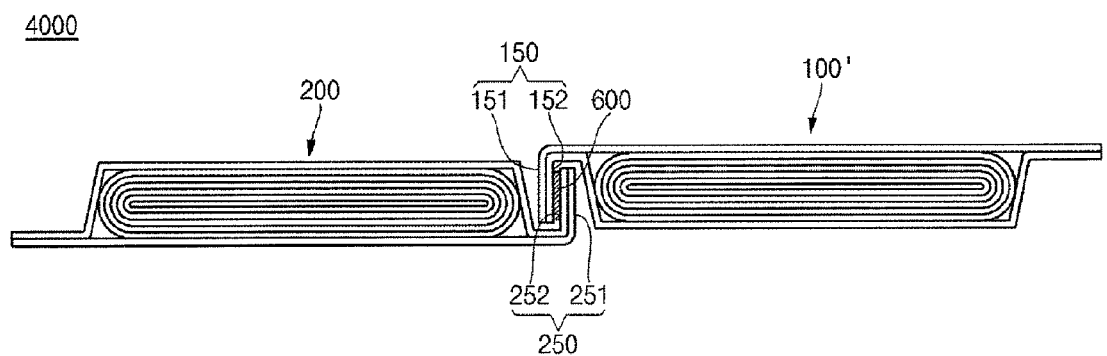
FIG. 5 illustrates a cross-sectional view of a battery pack according to still another example embodiment.

FIG. 5 illustrates a cross-sectional view of a battery pack according to still another example embodiment;

Referring to FIG. 5, the battery pack 4000 according to the present example embodiment includes a first battery 100', a second battery 200, and an adhesion member 600.

The battery pack 4000 is different from the battery pack 1000 in view of configurations of a first battery 100' and an adhesion member 600. Thus, the battery pack 4000 according to the present example embodiment will now be described with regard to the first battery 100' and the adhesion member 600. In addition, components of the battery pack 4000 according to the present example embodiment that are the same as or similar to that of the battery pack 1000 shown in FIG. 1 will be denoted by the same reference, and details thereof may not be repeated.

While the first battery 100 and the second battery 200 of the battery pack 1000 shown in FIG. 1 are arranged in the same direction, the first battery 100' and the second battery 200 of the battery pack 4000 according to the present example embodiment may be arranged in the opposite directions. Compared to the first battery 100 of the battery pack 1000 shown in FIG. 1, the first battery 100' of the battery pack 4000 according to the present example embodiment is reversed, so that a second surface 152 of a bent part 150 of the first battery 100' is opposite to and faces a second surface 252 of a bent part 250 of the second battery 200.

In the present example embodiment, the adhesion member 600 is interposed between the second surface 152 of the bent part 150 of the first battery 100' and the second surface 252 of the bent part 250 of the second battery 200. Here, since the kind of the adhesion member 600 is the same as that of the adhesion member 300 shown in FIG. 1, details thereof will not be repeated.

In the battery pack 4000 shown in FIG. 5, the bent part 150 of the first battery 100' and the bent part 250 of the second battery 200 overlap each other, thereby reducing the overall width of the battery pack 4000, compared to the battery pack 1000. Therefore, compared to the battery pack 1000 in which the first battery 100 and the second battery 200 are arranged in the same direction, the battery pack 4000 may have an increased capacity density.

Next, a battery pack 5000 according to still another example embodiment will be described.

Figure 6:
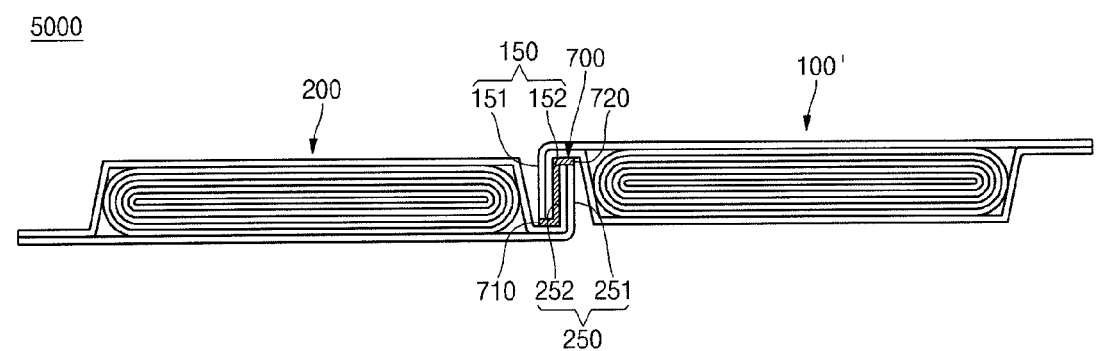
FIG. 6 illustrates a cross-sectional view of a battery pack according to still another example embodiment.

FIG. 6 illustrates a cross-sectional view of a battery pack according to still another example embodiment;

Referring to FIG. 6, the battery pack 5000 according to the present example embodiment includes a first battery 100', a second battery 200, and an adhesion member 700.

The battery pack 5000 is different from the battery pack 4000 in view of a configuration of an adhesion member 700. Thus, the battery pack 5000 according to the present example embodiment will now be described with regard to the adhesion member 700. In addition, components of the battery pack 5000 according to the present example embodiment that are the same as or similar to that of the battery pack 4000 shown in FIG. 5 will be denoted by the same reference, and details thereof may not be repeated.

In the present example embodiment shown in FIG. 6, the adhesion member 700 is substantially shaped as a letter "Z" having a head 710 and a tail 720.

The head 710 is interposed between an end of a bent part 150 of the first battery 100' and a second surface 252 of the second battery 200. An adhesive material may be coated on both surfaces of the head 710.

In addition, the tail 720 is interposed between an end of a bent part 250 of the second battery 200 and a second surface 152 of the first battery 100'. An adhesive material may be coated on both surfaces of the tail 720.

The adhesion member 700 may be interposed between the end of the bent part 150 of the first battery 100' and the second surface 252 of the second battery 200, or between the end of the bent part 250 of the second battery 200 and the second surface 152 of the first battery 100'. The adhesion member 700 may have a wider adhesion area than the adhesion member 600 of the battery pack 4000 shown in FIG. 5. Thus, the first battery 100' and the second battery 200 may be more firmly adhered to each other.

Next, a method for manufacturing a battery pack 100 according to an example embodiment will be described.

Figure 7:
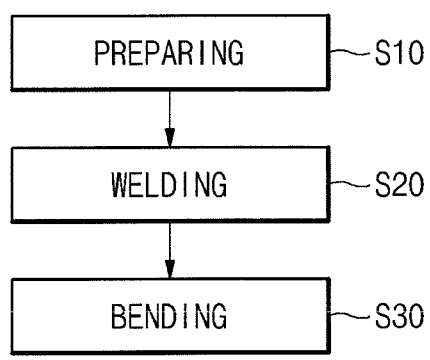
FIG. 7 is a flowchart of stages in a method for manufacturing a battery pack according to an embodiment.
Figure 8A:
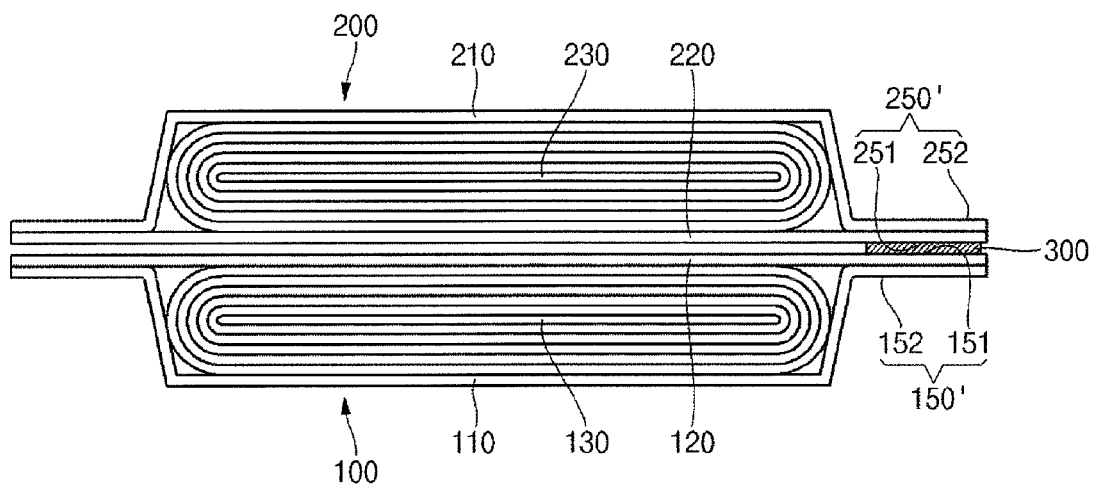
FIGS. 8A to 8C illustrate partial cross-sectional views of stages in a method for manufacturing a battery pack according to an embodiment.
Figure 8B:
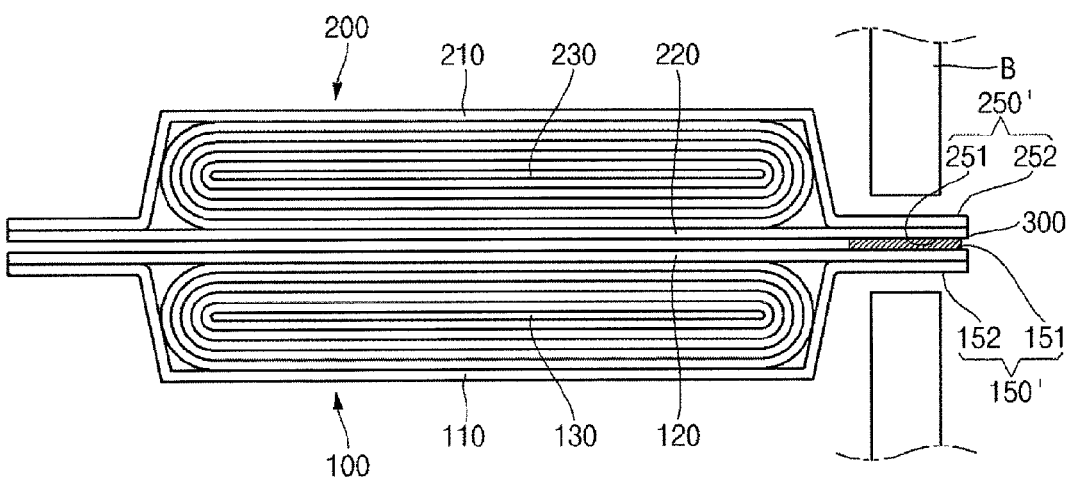
Figure 8C:
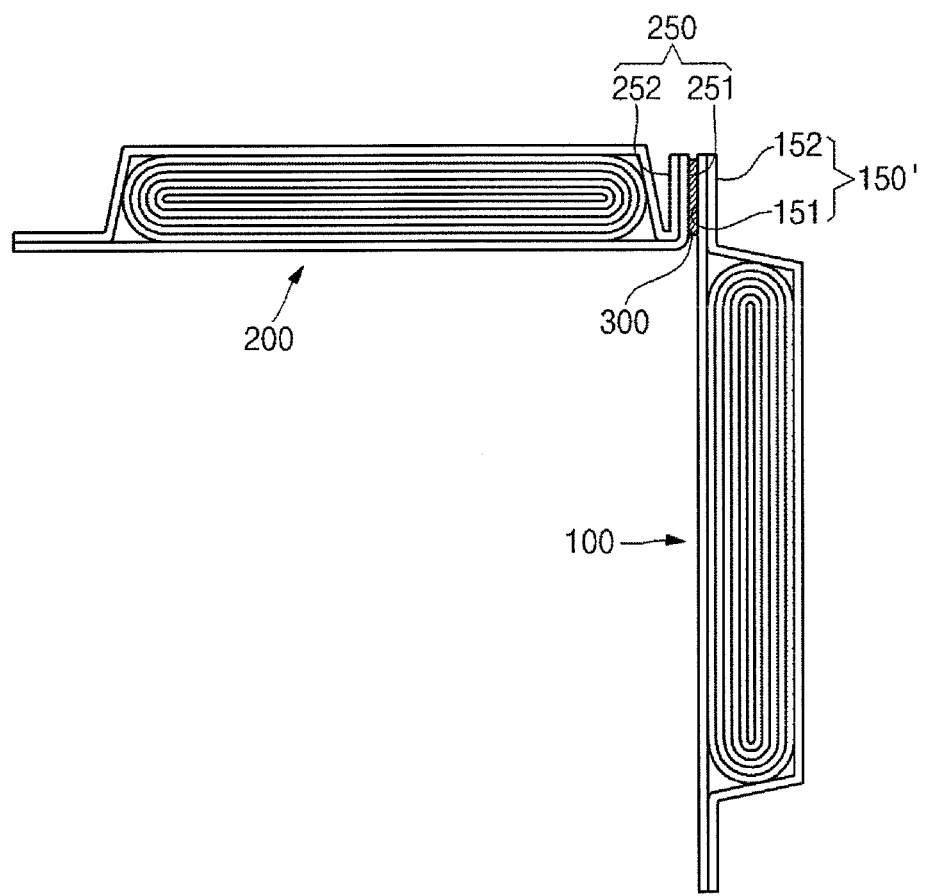

FIG. 7 is a flowchart of stages in a method for manufacturing a battery pack according to an embodiment, and FIGS. 8A to 8C illustrate partial cross-sectional views of stages in a method for manufacturing a battery pack according to an embodiment.

Referring to FIGS. 7 and 8A to 8C, the method for manufacturing a battery pack according to the present example embodiment includes preparing (S10), welding (S20), and bending (S30).

Referring to FIG. 8A, in the preparing (S10), a first battery 100 may first be disposed and a second battery 200 may then be disposed to face the first battery 100. An adhesion member 300 may be interposed between a first surface 151 of one side 150' of the first battery 100' and a first surface 251 of one side 250' of the first battery 200.

Referring to FIG. 8B, in the welding (S20), a second surface 152 of one side 150' of the first battery 100' and a second surface 252 of one side 250' of the second battery 200 may be compressed using a welding bar (B). The welding bar B may have a predetermined temperature or higher for transmitting heat to the adhesion member 300 when the adhesion member 300 is formed of a thermosetting tape. The adhesion member 300 may be fused by the heat of the welding bar B, and the first surface 151 of the one side 150' of the first battery 100' and the first surface 251 of the one side 250' of the first battery 200 may be adhered to each other.

Referring to FIG. 8C, in the bending (S30), the one side 250' of the second battery 200 may be bent, thereby forming the bent part 250. Although not shown, the one side 150' of the first battery 100' may be bent, thereby forming the bent part 150.

While FIG. 8C shows that the second battery 200 is first bent, this is provided only as an example, and the first battery 100 may first be bent. In an implementation, the first battery 100 and the second battery 200 may be simultaneously bent.

In addition, while FIG. 8C shows that the bent part 250 of the second battery 200 is bent by approximately 90°, this is provided only as an example. For example, the bent parts 150 and 250 may be bent by approximately 45°, and four battery packs may make a round to then be welded to each other. In addition, the bent parts 150 and 250 may be bent by approximately 60°, and six battery packs may make a round to then be welded to each other.

Although not shown, the method for manufacturing the battery pack according to the present example embodiment may further include clamping. As shown in FIG. 3, the clamp 400, which may be substantially shaped as a letter "n" in form of an insulator, may be clamped to cover the second surface 152 of the bent part 150 of the first battery 100, the second surface 252 of the bent part 250 of the second battery 200 and the ends of the bent parts 150 and 250. The clamp 400 may prevent an electrical short-circuit between the ends of bent parts 150 and 250 and an external device (for example, an external set, a protective circuit module, etc.). In addition, the clamp 400 may hold the second surfaces 152 and 252 of the bent parts 150 and 250 by a mechanical force. Thus, the first battery 100 and the second battery 200 may be more firmly welded to each other.

Next, a method for manufacturing a battery pack 4000 according to an example embodiment will be described.

Figure 9A:
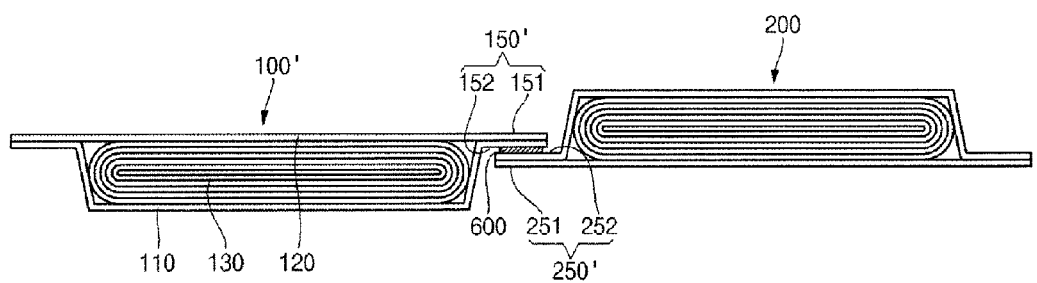
FIGS. 9A to 9C illustrate partial cross-sectional views of stages in a method for manufacturing a battery pack according to still another example embodiment.
Figure 9B:
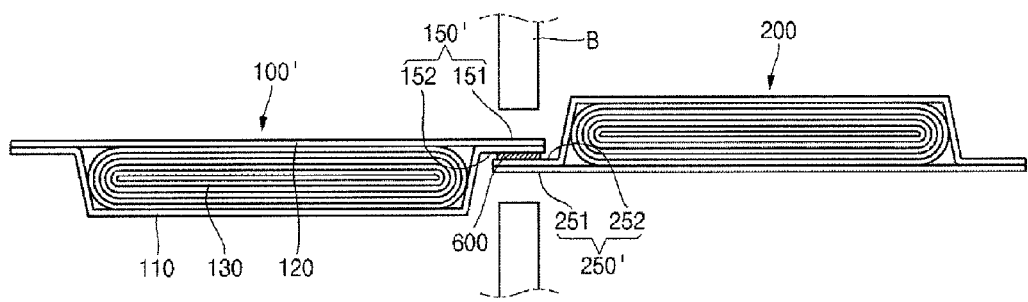
Figure 9C:
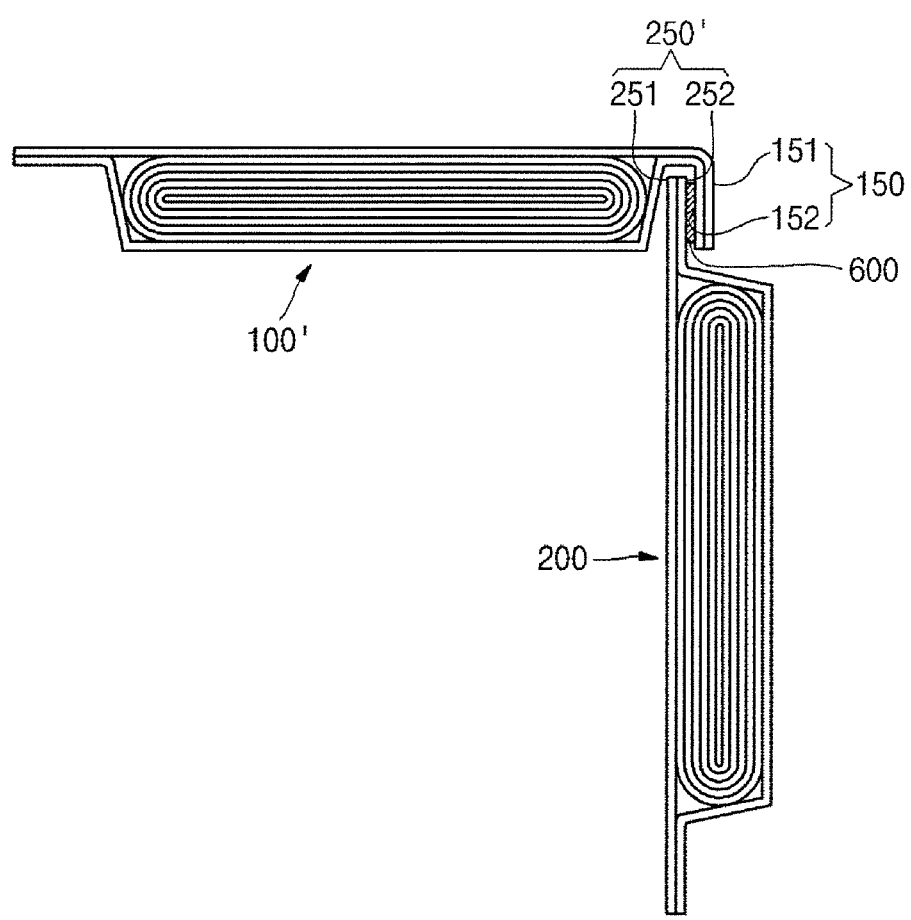

FIG. 7 is a flowchart of stages in a method for manufacturing a battery pack according to an embodiment, and FIGS. 9A to 9C illustrate partial cross-sectional views of stages in a method for manufacturing a battery pack according to still another example embodiment.

Referring to FIGS. 7 and 9A to 9C, the method for manufacturing a battery pack according to the present example embodiment includes preparing (S10), welding (S20), and bending (S30).

Referring to FIG. 9A, in the preparing (S10), the first battery 100' may first be disposed. Then, the second battery 200 may be disposed to face the first battery 100', such that one side 150' of the first battery 100' and one side 250' of the second battery 200 overlap each other. The second surface 152 of one side 150' of the first battery 100' and the second surface 252 of the second battery 200 may be opposite to and face each other. An adhesion member 600 may be interposed between the second surface 152 of one side 150' of the first battery 100' and the second surface 252 of one side 250' of the second battery 200.

Referring to FIG. 9B, in the welding (S20), a first surface 151 of one side 150' of the first battery 100' and a first surface 251 of one side 250' of the first battery 200 may be compressed using a welding bar (B). The welding bar B may have a predetermined temperature or higher to transmit heat to the adhesion member 600 when the adhesion member 600 is formed of a thermosetting tape. The adhesion member 600 may be fused by the heat of the welding bar B, and the second surface 152 of one side 150' of the first battery 100' and the second surface 252 of the one side 250' of the second battery 200 may be adhered to each other.

Referring to FIG. 9C, in the bending (S30), the one side 150' of the first battery 100' may be bent, thereby forming the bent part 150. Although not shown, the one side 250' of the second battery 200 may be bent, thereby forming the bent part 250.

While FIG. 9C shows that the first battery 100' is first bent, this is provided only as an example, and the second battery 200 may first be bent. In an implementation, the first battery 100' and the second battery 200 may be simultaneously bent.

In addition, while FIG. 9C shows that the bent part 150 of the first battery 100' is bent by approximately 90°, this is provided only as an example. For example, the bent part of one side of each of bent parts 150 and 250 may be bent by approximately 45° and the bent part of the other side of each of the bent parts 150 and 250 may be bent by approximately 135°. Thus, four battery packs may make a round to then be welded to each other.

By way of summation and review, a pouch-type secondary battery may include an electrode assembly and a pouch case encasing and sealing the electrode assembly. The electrode assembly may be formed by stacking or winding a positive electrode plate and a negative electrode plate with a separator interposed therebetween. Electrode tabs may be welded to the positive electrode plate and the negative electrode plate, and then assembled with the pouch case in a state in which the tabs protrude to the outside of the pouch case when the electrode assembly is received in the pouch case.

The pouch case may include a lower pouch body having a space in which the electrode assembly may be received, and a pouch cover extending from one end of the pouch body and covering the pouch body. The pouch body and the pouch cover may be welded to each other such that the pouch cover is sealed to a flange formed at one side of the pouch body.

As described above, embodiments may provide a battery pack and a method for manufacturing the same, which may reinforce a connection structure of the battery pack by welding bent parts of first and second batteries. Embodiments may provide a battery pack and a method for manufacturing the same, which may improve adhesion reliability using a thermosetting tape as an adhesion member. Embodiments may provide a battery pack and a method for manufacturing the same, which may prevent an electrical short-circuit between a first battery and a second battery with covering ends of bent parts of the first and second batteries by an adhesion member. Embodiments may provide a battery pack and a method for manufacturing the same, which may prevent an electrical short-circuit between a first battery and a second battery, and may further reinforce a connection structure of the battery pack by clamping ends of bent parts of the first and second batteries using clamps.

As described above, in the battery pack and the method for manufacturing the same according to embodiments, a connection structure of the battery pack may be reinforced by welding bent parts of first and second batteries. In the battery pack and the method for manufacturing the same according to embodiments, adhesion reliability may be improved using a thermosetting tape as an adhesion member. In the battery pack and the method for manufacturing the same according to embodiments, an electrical short-circuit between a first battery and a second battery may be prevented by covering ends of bent parts of the first and second batteries by an adhesion member. In the battery pack and the method for manufacturing the same according to embodiments, an electrical short-circuit between a first battery and a second battery may be prevented and a connection structure of the battery pack may be further reinforced by clamping ends of bent parts of the first and second batteries using clamps.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a first battery and a second battery each having a bent part at one side; and
an adhesion member interposed between the bent part of the first battery and the bent part of the second battery and adhering the bent part of the first battery to the bent part of the second battery,
wherein:
the adhesion member is shaped as a letter "T" having a stem and a head, the stem being longer than the head,
the stem of the adhesion member is between the bent parts of the first battery and the second battery and completely spaces the entire bent part of the first battery apart from the entire bent part of the second battery, and
the head of the adhesion member covers an end of the bent part of the first battery and an end of a bent part of the second battery.

2. The battery pack as claimed in claim 1, wherein the first battery and the second battery are pouch-type batteries.

3. The battery pack as claimed in claim 1, wherein the adhesion member is a thermosetting tape.

4. The battery pack as claimed in claim 1, wherein each of the bent part of the first battery and the bent part of the second battery has a first surface and a second surface opposite to the first surface.

5. The battery pack as claimed in claim 4, wherein the adhesion member is interposed between the first surface of the bent part of the first battery and the first surface of the bent part of the second battery.

6. A method for fabricating a battery pack, the method comprising:
arranging a first battery and a second battery such that one side of the first battery and one side of the second battery face each other, and preparing an adhesion member interposed between the one side of the first battery and the one side of the second battery;
welding the adhesion member to adhere the one side of the first battery to the one side of the second battery; and
bending the one side of the first battery and the one side of the second battery to form bent parts at the first and second batteries,
wherein:
the adhesion member is shaped as a letter "T" having a stem and a head, the stem being longer than the head,
the stem of the adhesion member is between the bent parts of the first battery and the second battery and completely spaces the entire bent part of the first battery apart from the entire bent part of the second battery, and
the head of the adhesion member covers an end of the bent part of the first battery and an end of a bent part of the second battery.

7. The method as claimed in claim 6, wherein the first battery and the second battery are pouch-type batteries.

8. The method as claimed in claim 6, wherein the adhesion member is a thermosetting tape.

9. The method as claimed in claim 6, wherein each of the one side of the first battery and the one side of the second battery has a first surface and a second surface opposite to the first surface.

10. The method as claimed in claim 9, wherein in the preparing, the first battery and the second battery are arranged to face each other, and the adhesion member is interposed such that after the bending the adhesion member is between the first surface of the one side of the first battery and the one side of the bent part of the second battery.

11. The method as claimed in claim 10 further comprising, after the bending, clamping the second surface of the one side of the first battery, the second surface of the one side of the second battery, and the ends of the bent parts of the first and second batteries using a clamp.

12. The method as claimed in claim 11, wherein the clamp is an insulator.

13. The battery pack as claimed in claim 1, wherein the stem of the adhesion member has a flattened shape that continuously extends between the bent parts of the first battery and the second battery.

14. The battery pack as claimed in claim 1, wherein no portion of the bent part of the first battery directly contacts any portion of the bent part of the second battery.

* * * * *